United States Patent [19]
Ewing

[11] Patent Number: 5,724,643
[45] Date of Patent: Mar. 3, 1998

[54] LIGHTWEIGHT HIGH STIFFNESS SHAFT AND MANUFACTURING METHOD THEREOF

[75] Inventor: Bruce Ewing, Martinsville, Ind.

[73] Assignee: Allison Engine Company, Inc., Indianapolis, Ind.

[21] Appl. No.: 470,180

[22] Filed: Jun. 7, 1995

[51] Int. Cl.$^6$ .................... B22F 3/12; B22F 3/14; B22F 7/04; B22F 5/00
[52] U.S. Cl. .................... 419/8; 419/29; 419/49
[58] Field of Search .................... 419/8, 29, 49

[56] References Cited

U.S. PATENT DOCUMENTS

| | | | |
|---|---|---|---|
| Re. 32,389 | 4/1987 | Becker et al. | 29/157.1 R |
| 3,168,399 | 2/1965 | Takahashi et al. | 75/208 |
| 3,892,030 | 7/1975 | De Pierre et al. | 29/420 |
| 3,899,325 | 8/1975 | Harrison | 75/208 R |
| 4,077,109 | 3/1978 | Larson | 29/420 |
| 4,143,208 | 3/1979 | Aslund | 428/558 |
| 4,147,837 | 4/1979 | Nieman | 428/548 |
| 4,270,256 | 6/1981 | Ewing | 29/156.8 R |
| 4,364,162 | 12/1982 | Nilsson et al. | 419/26 |
| 4,544,523 | 10/1985 | McCollough et al. | 419/8 |
| 4,584,170 | 4/1986 | Aslund et al. | 419/5 |
| 4,596,694 | 6/1986 | Rozmus | 419/49 |
| 4,647,426 | 3/1987 | Fiorentino | 419/31 |
| 4,747,225 | 5/1988 | Gsettner et al. | 42/76.02 |
| 4,748,088 | 5/1988 | Billgren | 428/558 |
| 4,756,677 | 7/1988 | Hribernik et al. | 419/8 |
| 4,765,952 | 8/1988 | Kemp, Jr. | 419/47 |
| 4,820,141 | 4/1989 | Shingu et al. | 414/8 |
| 4,834,693 | 5/1989 | Profant et al. | 464/183 |
| 4,896,815 | 1/1990 | Rosenthal et al. | 228/120 |
| 4,965,043 | 10/1990 | Tornberg | 419/8 |
| 4,966,748 | 10/1990 | Miyasaka et al. | 419/8 |
| 4,976,915 | 12/1990 | Kuroki | 419/8 |
| 5,004,653 | 4/1991 | Kroisenbrunner | 428/615 |
| 5,043,137 | 8/1991 | Lazcano-Navarro et al. | 419/8 |
| 5,043,320 | 8/1991 | Meyer et al. | 505/1 |
| 5,082,623 | 1/1992 | Ekbom | 419/8 |
| 5,130,084 | 7/1992 | Matheny et al. | 419/8 |
| 5,154,882 | 10/1992 | Zick | 419/49 |
| 5,318,214 | 6/1994 | Lucas, Jr. et al. | 228/121 |

FOREIGN PATENT DOCUMENTS

| | | |
|---|---|---|
| 3409581A | 9/1984 | Germany . |
| 4027564A | 3/1992 | Germany . |
| 4240045C | 3/1994 | Germany . |
| 2002817 | 8/1979 | United Kingdom . |

*Primary Examiner*—Charles T. Jordan
*Assistant Examiner*—Daniel Jenkins
*Attorney, Agent, or Firm*—Woodard, Emhardt, Naughton, Moriarty & McNett

[57] ABSTRACT

A high performance hybrid shaft for use in applications where high stiffness, high temperature capacity and lightweight are important. In one form of the present invention the hybrid shaft is formed of a titanium alloy outer tube having in it's interior a gamma titanium aluminide alloy powder metal that is metallurgically bonded to the outer tube. The gamma titanium aluminide alloy powder metal has a room temperature modulus of elasticity greater than the modulus of elasticity of the titanium alloy tube. The hybrid shaft has a modulus of elasticity greater than modulus of elasticity of the titanium alloy tube, and a density equivalent to that of the titanium alloy tube. The wear resistant capability of the shaft is increased at local regions by surface modification treatment such as plasma ion nitrating or by affixing at the ends of the tube a hardened steel fitting. Fabrication of the hybrid shaft involves filling the titanium alloy tube with gamma titanium aluminide alloy powder, sealing the ends and than hot isostatically pressing the assembly to densify the powder metal and create a metallurgical bond between two components.

35 Claims, 3 Drawing Sheets

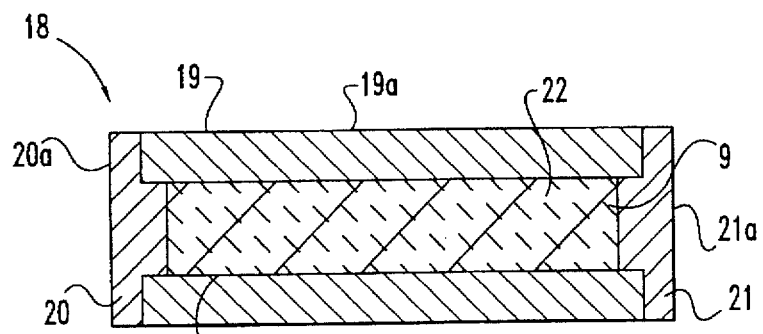
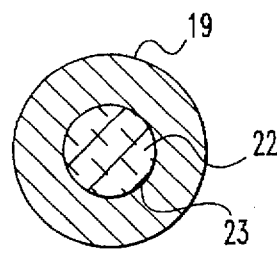
Fig. 3     Fig. 4
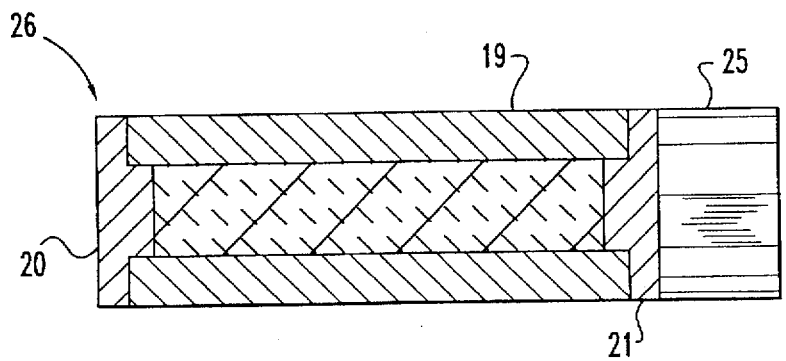
Fig. 5
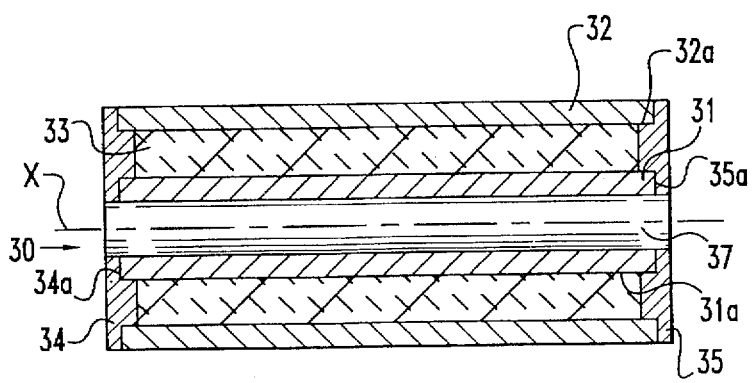
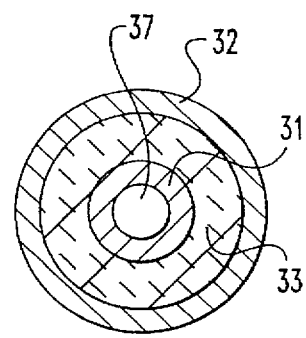
Fig. 6     Fig. 7

LIGHTWEIGHT HIGH STIFFNESS SHAFT AND MANUFACTURING METHOD THEREOF

BACKGROUND OF THE INVENTION

The present invention relates generally to the design and fabrication of a lightweight titanium shaft having stiffness and temperature characteristics that could allow the design of lighter, simpler and more cost effective mechanical arrangements. More particularly, the present invention has one form wherein a high performance shaft is formed of a titanium alloy tube having a titanium aluminide powder metal core metallurgically bonded therein. The high performance hybrid shaft of the present invention has significantly increased stiffness over conventional titanium alloy shafts with no effective increase in density. Although the invention was developed for use in a gas turbine engine, certain applications may be outside of this field.

It is well known that a gas turbine engine integrates a compressor and a turbine that have components that rotate at extremely high speeds and the components are generally subjected to extreme temperatures. The rotatable components are coupled to shafts which are also subjected to the elevated temperatures and loading inherent to most gas turbine engines. The necessity for extremely reliable and durable shafts have resulted in the utilization of high strength, high temperature materials for their fabrication; materials utilized include titanium alloys, nickel based super alloys, and cobalt based super alloys. In spite of the cost and difficulty associated in forming these materials they have been utilized extensively to produce gas turbine engine shafts. Gas turbine engine designers strive to decrease the weight of rotating gas turbine engine components which provides many benefits including a reduction in the centrifugal forces generated by these components. Further, the reduction in weight of the components in an aircraft gas turbine engine reduces the power consumed in the propulsion of these components.

Designers of gas turbine engines are fully cognizant that one technique for reducing the weight of gas turbine components is to use lower density materials. However, most of the commonly available low density materials do not have material characteristics suitable to withstand the operating environment within the gas turbine engine. Therefore gas turbine engine designers have generally utilized shaft systems manufactured of contemporary steel and nickel based alloys. More recently, the designers of gas turbine engine shaft systems have utilized titanium alloys in order to produce a relatively lightweight high stiffness shaft. Prior shaft designs have often been limited by the relative stiffness and density of the material.

The relatively recent development of titanium alloys based on an intermetallic compound, gamma titanium aluminide (TiAl), having good high temperature (to about 1600° F.) properties makes them ideal candidates for high temperature components within a gas turbine engine. Further, because of their high strength to weight ratios, gamma titanium aluminides may be used to fabricate parts having substantially lighter weight then parts fabricated from nickel based super alloy parts.

Although gamma titanium aluminides have material properties that are very desirable from a component design standpoint, they are brittle at room temperature and are considered generally hard to fabricate. For many applications involving gamma titanium aluminides, either fusion welding or brazing would probably be the most desirable techniques for joining the gamma titanium aluminide details to a similar material or to other high temperature materials. However, existing welding and brazing techniques have proved unsatisfactory in many respects for providing reliable high temperature joints for titanium aluminide alloys. Therefore, a need exists for a fabrication technique that can lead to a lightweight high stiffness shaft that can utilize the material characteristics of titanium aluminide in combination with dissimiliar material combinations such as steel, nickel or conventional titanium where there unique toughness and hardness characteristics might be dictated by a multi-alloy fabricated system by design requirements.

Although the migration from contemporary steel and nickel based shafts to titanium alloy shafts is a step in the right direction, the need for additional improvement in producing a lightweight high stiffness shaft still remains. The present invention satisfies this need in a novel and unobvious way.

SUMMARY OF THE INVENTION

One form of the present invention contemplates a method for manufacturing a high stiffness shaft. The method comprising: providing a tube having in its interior a material made from a powder metal having a modulus of elasticity greater than the modulus of elasticity of the tube; and creating a metallurgical bond between the tube and the material so that the shaft has a modulus of elasticity greater than the modulus of elasticity that the tube would have without the material being bonded to it.

Another form of the present invention contemplates a member, comprising: a tube; a core made from powder metal positioned within the tube, the core being metallurgically bonded to the tube; and the member having a room temperature modulus of elasticity greater than the modulus of elasticity the tube would have without the core being bonded to it and a density about equal to the tube.

One object of the present invention is to provide an improved lightweight high stiffness high temperature shaft.

Related objects and advantages of the present invention will be apparent from the following description.

BRIEF DESCRIPTION OF THE DRAWINGS

FIG. 3 is a side elevational in full section of one form of the lightweight high stiffness shaft of the present invention.

FIG. 4 is a end view of the FIG. 3 shaft with the end cap removed.

FIG. 5 is a side elevational view of another form of the lightweight high stiffness shaft of the present invention including a hardened fitting joined thereto.

FIG. 6 is a side elevational view in full section of another form of the present invention having a double walled tube.

FIG. 7 is a end view of the FIG. 6 shaft with the end cap removed.

DESCRIPTION OF THE PREFERRED EMBODIMENT

Figure 1:
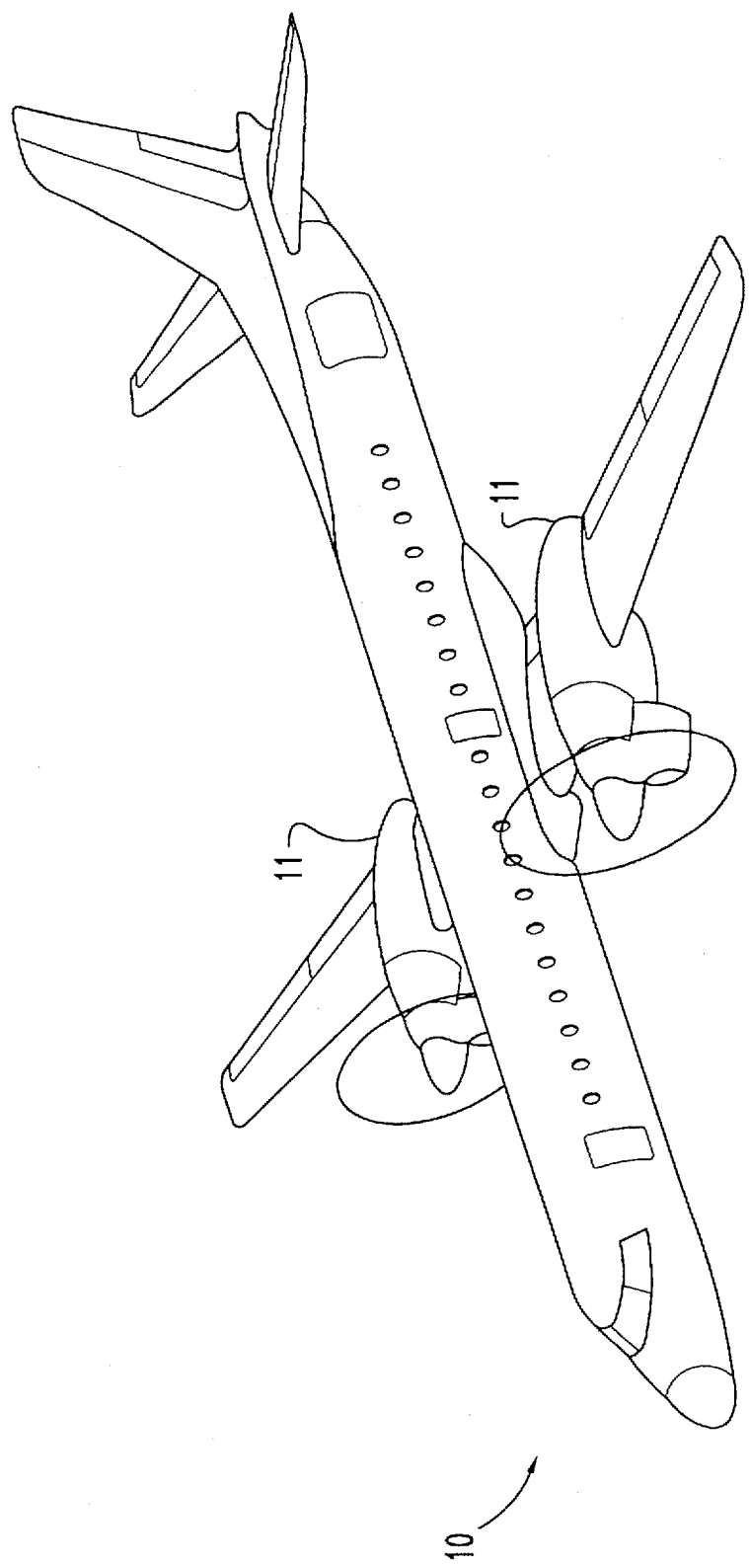
FIG. 1 is a perspective view of an aircraft having a gas turbine engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
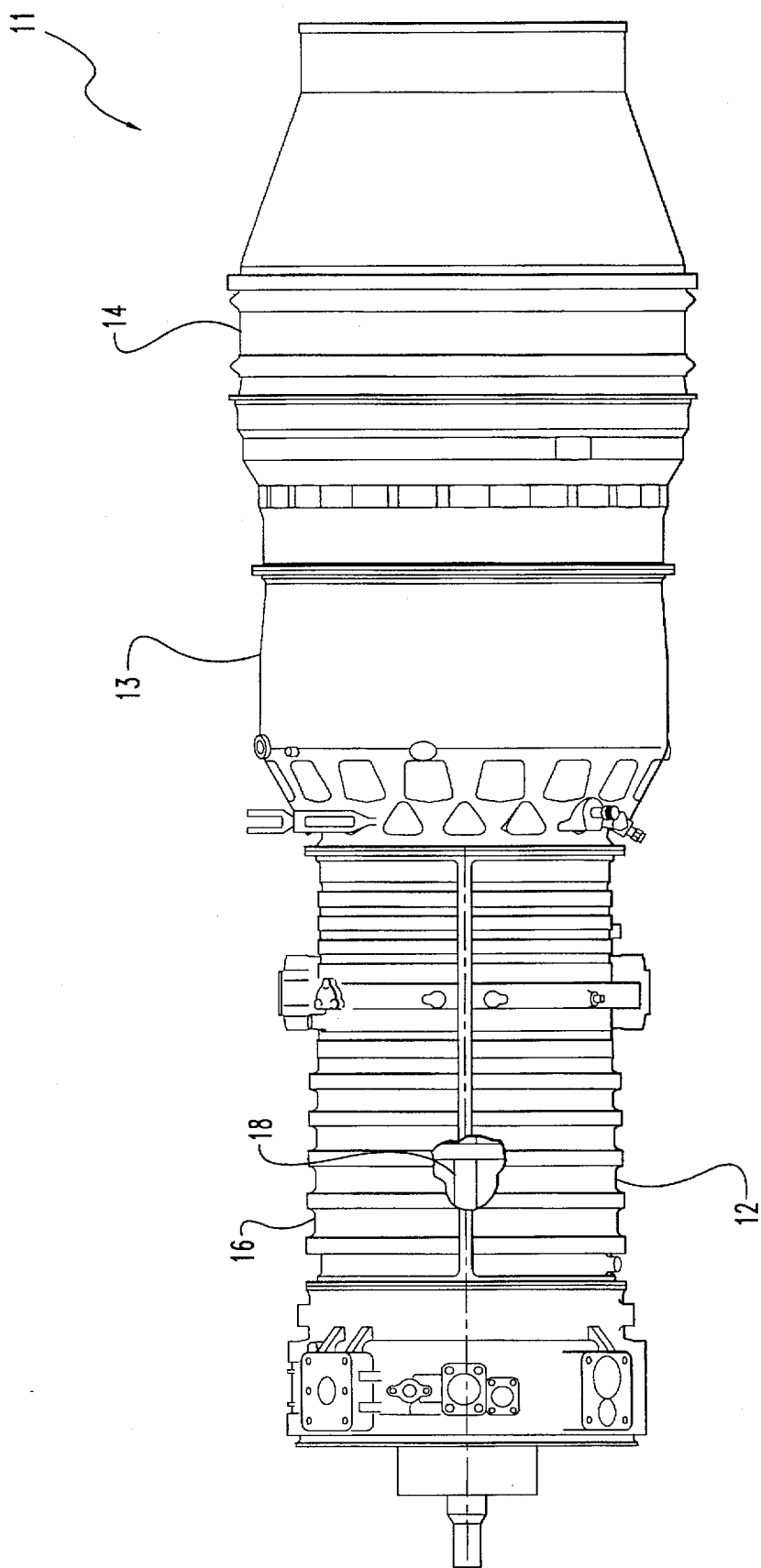
FIG. 2 is a partially fragmented enlarged side elevational view of the gas turbine engine of FIG. 1.

With reference to FIG. 1, there is illustrated an aircraft 10 having an aircraft flight propulsion engine 11. It is understood that an aircraft is generic and includes helicopters, tactical fighters, trainers, missiles, and other related apparatuses. With reference to FIG. 2, the preferred embodiment of a flight propulsion engine 11 defines a gas turbine engine integrating a compressor 12, a combustor 13 and a power turbine 14. It is important to realize that there are a multitude of ways in which the components can be linked together. Additional compressors and turbines could be added with intercoolers connected between the compressors and reheat combustion chambers could be added between the turbines. Further, the gas turbine engine 11 is equally suited to be used for industrial applications. The axial flow compressor 12 for pressurizing a fluid includes a casing 16 and a plurality of blade rows that are fixably mounted to a shaft 18. It is contemplated that the lightweight, high stiffness shaft of the present invention can be utilized in other mechanical devices besides a gas turbine engine.

With reference to FIGS. 3-4, there is illustrated the shaft 18 which is designed for applications where high stiffness, lightweight and high temperature capabilities are important. The shaft 18 includes a substantially cylindrical outer member 19, a pair of circular end caps 20 and 21 and an inner member 22. In the preferred embodiment the substantially cylindrical outer member 19 is a tube formed of a conventional titanium alloy, such as Ti-6Al-4V. A person skilled in the art will recognize that the modulus of elasticity for a conventional titanium alloy is about $16 \times 10^6$ pounds per square inch (psi). Positioned within a central aperture 23, that extends longitudinally through the cylindrical outer member 19 is the inner member/core 22 that is formed of a powder metal. In the preferred embodiment inner member/core 22 is formed of a gamma titanium aluminide alloy powder, such as Ti-33Al-5Cb-1W (volume present). The room temperature modules of elasticity for a fully consolidated gamma titanium aluminide composition is about $24 \times 10^6$ psi. Therefore, the powder metal inner member/core 22 that is positioned within outer member 19 has a modulus of elasticity greater than the modulus of elasticity the outer member 19 would have without the core being bonded to it.

The pair of circular end caps 20 and 21 are connected to the opposite ends of the outer member 19. In the preferred embodiment the end caps 20 and 21 are formed of a conventional titanium alloy such as Ti-6Al-4v. Further, in the preferred embodiment the end caps 20 and 21 are welded to the outer member 19 to form an evacuated air tight sealed assembly. An electron beam welding operation, that is well known to those skilled in the art, is one method to weld the end caps 20 and 21 to the outer member 19. The pair of end caps 20 and 21 being fixidly mounted to the outer member 19 and creating a substantially fluid tight seal.

An assembly comprising the outer member 19, end caps 20 and 21 and inner member 22 is subjected to a hot isostatic pressing (HIP) operation. The HIP operation is performed in a conventional fashion to densify the titanium aluminide alloy powder metal inner member 22 and create a metallurgical bond between the inner member 22 and the outer member 19. U.S. Pat. No. 4,270,256 to Ewing is incorporated herein by reference, and includes general information on HIP processes. The HIP process insures intimate contact between the powder metal inner member 22 and the outer member 19 so that they are connected by diffusion bonding therebetween to produce a high quality metallurgical joint therebetween.

The hybrid shaft 18 of the preferred embodiment includes the titanium alloy tube 19 with a fully consolidated gamma titanium aluminide powder metal inner member 22 metallurgically bonded therein. One example of a hybrid shaft 18 comprises about 10% by volume titanium alloy and about 90% by volume gamma titanium aluminide alloy. It is understood that other mixture ratios are contemplated by the present invention. A hybrid shaft 18 having the above mixture forms a hybrid shaft system having modulus of elasticity of about $23 \times 10^6$ psi at room temperature. This represents an approximate 44% increase in stiffness over conventional titanium alloy shafts with no increase in density. It is known that conventional titanium alloys and titanium aluminide alloys are very similar in density (on the order of about 0.150 to 0.160 lbs/in$^3$).

With reference to FIG. 5, there is illustrated another form of the lightweight high stiffness shaft 26 of the present invention. The lightweight high stiffness shaft 26 is substantially identical to shaft 18 with like numbers being utilized for identical parts herein. Shaft 26 includes at least one end fitting attachment member 25 connected to at least one of the end caps 20 and 21. The end fitting attachment member 25 may include, for example a spline or other feature necessary for connecting the shaft 18 to another component (not illustrated). In one form of the present invention end fitting attachment member 25 is formed of material having superior wear resistance characteristics to the titanium alloy outer member 19 and end caps 20 and 21. The end fitting attachment member 25 being coupled to one of the end caps 20 and 21 or the outer member 19 by inertia welding, or any other technique that produce a reliable connection. Further, in an alternative embodiment the end fitting attachment member 25 is formed of a material having a wear resistance comparable to a titanium alloy.

With reference to FIGS. 3-4, there is illustrated the lightweight high temperature shaft having significantly increased stiffness and temperature capabilities over conventional titanium alloy shafts. A surface modification treatment can be selectively applied to the entire shaft 18, or portions thereof to increase the shaft's wear resistance characteristics. One form of surface modification treatment is generally known as plasma ion nitrate.

Referring to FIGS. 6 & 7, there is illustrated an alternative form of the lightweight high stiffness shaft 30 of the present invention. The shaft 30 is substantially similar to the shafts 18 and 26 described herein, and like numbers will be used to represent identical items. Shaft 30 comprises a substantially cylindrical inner tube 31, a substantially cylindrical outer tube 32, and a substantially annular core 33 disposed therebetween. The inner tube 31 and the outer tube 32 being concentric. It is understood that other geometric shapes are contemplated herein.

Inner tube 31 and the outer tube 32 being formed of a conventional titanium alloy, such as Ti-6Al-4V. The annular core 33 is formed of a fully consolidated powder metal, and preferably is a gamma titanium aluminide alloy. Annular core 33 is metallurgically bonded to the outer surface 31a of tube 31 and the inner surface 32a of outer tube 32. A pair of opposite annular end caps 34 and 35 are connected at each end of the tubes 31 and 32. A circular recess 34a and 35a is formed in the end caps 34 and 35 respectively to receive and position the opposite ends of the inner and outer tubes 34 and 35 therein. A substantially cylindrical aperture 37 extends longitudinally through the shaft 30 parallel to a centerline X.

A method to produce a lightweight high stiffness hybrid shaft illustrated in FIGS. 3–7, will now be described. A preferred technique for producing the hybrid shaft 18 involves providing a tube 19 having in its interior a material made from a powder metal having a modulus of elasticity greater than the modulus of elasticity of the tube 18. The powder metal material has been placed in the cavity within the tube 19 and a metallurgical bond is created between the tube 19 and the material so that the shaft has a modulus of elasticity greater than the modulus of elasticity that the tube would have without the material bonded to it.

The technique and method of fabricating a lightweight high stiffness shaft 18 further includes sealing one end of the tube 19 before the powder metal material is placed therein. It is understood that the present method works for many other configurations of shafts. It is preferred that an end cap 20 or 21 is welded to the tube 19 prior to the powder metal material being placed therein. After the powder metal material gamma titanium aluminide alloy has been placed in the interior of the tube the opposite other end is sealed off with the other end cap 20 or 21. The opposite other end cap is then electron beam welded to the tube 19. During the welding of the end cap to the tube 19 the inner cavity 9 is evacuated to keep it as free of air as possible. A connection linking the inner cavity 9 to an external evacuation device is not illustrated. Following the evacuation and sealing steps the assembly is hot isostatically pressed (HIP) to densify the powder metal inner member 22 within tube 19 and to create the metallurgical bond between the tube 19 and the inner member 22.

Hot isostatic pressing (HIP) is generally known to those skilled in in the art, and in fabricating shaft 18 the titanium alloy tube-titanium aluminide powder core assembly is placed in a HIP vessel (not illustrated). At elevated temperature, high pressure gas inside the pressure vessel applies a hydrostatic force to the outer surfaces 19a, 20a, and 21a of the shaft assembly. At the HIP temperature, powder metal inner member 22 and the titanium alloy outer member 19 have greatly reduced strength and provide very little resistance to movement under the effect of the HIP pressure. Therefore, the titanium alloy tube 19 moves toward the the powder metal inner member/core 22 as a result of the pressure and heat exerted during the HIP process. The HIP process causes the titanium alloy material to be metallurgically bonded to the consolidated and densified powder metal inner member 22.

In a preferred embodiment the tube 19 is constructed of a titanium alloy having a modulus of elasticity of about $16 \times 10^6$ psi, and the powder metal inner member 22 is formed of a fully consolidated gamma titanium aluminide composition having a modulus of elasticity of about $24 \times 10$ psi. An end fitting attachment member 25 is connected to one of the end caps 20 and 21. It is preferred that the mechanical end fitting attachment member 25 is of a hardened steel and that it is inertia welded to one of the end caps 20 or 21. In a further step of fabricating the shaft 18, a surface modification treatment is applied to the tube 19 and/or the mechanical attachment member 25. In the preferred embodiment the surface modification treatment includes plasma ion nitrate.

With reference to FIG. 6, there is illustrated the shaft 30 having aperture 37 formed therethrough. The method of fabricating shaft 30 is substantially the same as the method of fabricating shaft 19. In fabricating hybrid shaft 30, one end of the inner tube 30 is positioned within a recess 34a or 35a, formed in one of the end caps 34 or 35 respectively. The outer tube 32 is placed on the same end cap as above and the annulus between the outer tube 32 and the inner tube 31 is filled with the powder metal. The other end of the inner tube is then positioned within the recess 34a or 35a in the other end cap. End caps 34 and 35 are than welded to the outer tube 32 and the assembly is subjected to a hot isostatic pressing operation to produce shaft 30.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for manufacturing a high stiffness power transmission shaft, comprising:
   providing a tube having in its interior a material made from a powder metal having a modulus of elasticity greater than the modulus of elasticity of said tube; and
   creating a metallurgical bond between the tube and the material so that the shaft has a modulus of elasticity greater than the modulus of elasticity that the tube would have without the material being bonded to it.

2. The method of claim 1 wherein said creating includes hot isostatically pressing the tube and the material.

3. The method of claim 2, wherein in said providing step, the tube is of a titanium alloy.

4. The method of claim 3, wherein in said providing the powder metal is of a gamma titanium aluminide alloy.

5. The method of claim 4, wherein in said providing the tube has one end sealed by a first titianium alloy end cap.

6. The method of claim 5, additionally comprising:
   providing a second titanium alloy end cap; and
   attaching the second titanium alloy end cap to the tube prior to said creating a metallurgical bond.

7. The method of claim 6, additionally comprising evacuating the air from within the tube prior to said attaching the second titanium alloy end cap.

8. The method of claim 7, wherein said attaching of the second titanium alloy end cap to the tube includes welding the cap to the tube.

9. The method of claim 8, wherein said attaching of the second titanium end cap to the tube includes electron beam welding the cap to the tube.

10. The method of claim 9, additionally comprising:
    providing a steel end fitting; and
    coupling the steel end fitting to one of the end caps.

11. The method of claim 10, wherein said coupling includes inertial welding the steel end fitting to one of the end caps.

12. The method of claim 11, wherein in said providing the steel end fitting is hardened.

13. The method of claim 11, additionally comprising applying a surface modification treatment to the steel end fitting.

14. The method of claim 13, wherein said applying a surface modification treatment includes plasma ion nitriding.

15. The method of claim 1, additionally comprising applying a surface modification treatment to at least a portion of the outer surface of the tube.

16. The method of claim 15, wherein said applying a surface modification treatment includes plasma ion nitriding.

17. A power transmission member, comprising:

a tube;

a core made from powder metal positioned within said tube, said core being metallurgically bonded to the tube; and wherein the member having a room temperature modulus of elasticity greater than the modulus of elasticity the tube would have without the core being bonded to it and a density about equal to the tube.

18. The member of claim 17, which further includes a pair of end caps, one of said end caps being connected to each end of said tube.

19. The member of claim 18, wherein said pair of end caps are formed of the same material as said tube.

20. The member of claim 19, wherein said pair of end caps are fixidly mounted to said tube by welding and creates a substantially fluid tight seal.

21. The member of claim 20, wherein said tube having a longitudinal centerline, and wherein said tube having an aperture therethrough which is parallel to said longitudinal centerline, and further said core being positioned within said aperture.

22. The member of claim 21, which further includes an attachment member connected to one of said end caps.

23. The member of calim 22, wherein said attachment member is more wear resistant than said tube.

24. The member of claim 23, wherein said attachment member is of hardened steel.

25. The member of claim 24, wherein said attachment member has an outer surface, a portion of said outer surface having increased wear resistance.

26. The member of claim 25, whererin at least a portion of said outer surface of said attachment member has been subjected to plasma ion nitriding.

27. The member of claim 21, which further includes a wear resistant portion on said tube, said wear resistant portion having a greater wear resistance than the rest of said tube.

28. The member of claim 27, wherein said wear resistant portion has been plasma ion nitrided.

29. The member of claim 26, wherein said core is of gamma titanium aluminide alloy and said tube is of titanium alloy.

30. The member of claim 17, wherein said core is of gamma titanium aluminide alloy and said tube is of titanium alloy.

31. The member of claim 17, wherein said tube having a first wall and a second wall spaced therefrom, said walls being concentric and said core being positioned between said first wall and said second wall.

32. The member of claim 31, wherein said core being metallurgically bonded to said walls of said tube.

33. The member of claim 32, which further includes a pair of end caps, one of said end caps being connected to each end of said tube.

34. The member of claim 33, which further includes an attachment member connected to one of said end caps.

35. The member of claim 34, wherein said core is of gamma titanium aluminide and said tube is of titanium alloy.

* * * * *